US012609615B2

(12) United States Patent (10) Patent No.: US 12,609,615 B2
Hosotani et al. (45) Date of Patent: Apr. 21, 2026

(54) SWITCHING POWER SUPPLY DEVICE FOR REDUCING COMMON MODE NOISE GENERATED BY A SWITCHING ELEMENT

(71) Applicant: Murata Manufacturing Co., Ltd., Kyoto-fu (JP)

(72) Inventors: Tatsuya Hosotani, Nagaokakyo (JP); Hiroyuki Takatsuji, Nagaokakyo (JP); Yuki Ishikura, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 186 days.

(21) Appl. No.: 18/403,297

(22) Filed: Jan. 3, 2024

(65) Prior Publication Data

US 2024/0136926 A1 Apr. 25, 2024
US 2024/0235395 A9 Jul. 11, 2024

Related U.S. Application Data

(63) Continuation of application No. PCT/JP2022/026657, filed on Jul. 5, 2022.

(30) Foreign Application Priority Data

Aug. 2, 2021 (JP) ................................. 2021-126369

(51) Int. Cl.
H02M 3/158 (2006.01)
H02M 1/14 (2006.01)
H02M 1/44 (2007.01)
(52) U.S. Cl.
CPC ............. *H02M 3/158* (2013.01); *H02M 1/14* (2013.01); *H02M 1/44* (2013.01)
(58) Field of Classification Search
CPC ........ H02M 1/44; H02M 3/158; H02M 3/155; H02M 3/003; H02M 3/28; H02M 1/14
See application file for complete search history.

(56) References Cited

U.S. PATENT DOCUMENTS 10,873,255 B2 * 12/2020 Takatsuji ............. H03H 7/0115
2014/0313788 A1 * 10/2014 Okubo .................... H02M 3/28
363/21.01

(Continued)

FOREIGN PATENT DOCUMENTS

JP 2014-212623 A 11/2014
JP 2017-184328 A 10/2017

(Continued)

OTHER PUBLICATIONS

International Search Report issued in PCT/JP2022/026657; mailed Sep. 13, 2022.

*Primary Examiner* — Sisay G Tiku
(74) *Attorney, Agent, or Firm* — Studebaker Brackett PLLC

(57) ABSTRACT

A noise reduction circuit includes a surface-mount common mode choke coil mounted on a circuit board. Output terminals of the common mode choke coil are connected to an input capacitor via second circuit patterns. Two terminals of the input capacitor are connected to two input ends of a switching circuit via third circuit patterns. Path lengths of the second circuit patterns are longer than path lengths of the third circuit patterns. Of a plurality of current paths, the path lengths of the third circuit patterns are shortest in comparison with path lengths of other current paths. First circuit patterns are parallel and face each other to form a first parasitic capacitance, and the second circuit patterns are parallel and face each other to form second parasitic capacitances.

20 Claims, 6 Drawing Sheets

(56)         References Cited

U.S. PATENT DOCUMENTS

| | | | | |
|---|---|---|---|---|
| 2023/0327539 | A1* | 10/2023 | Ishikura ............ | H02M 7/53871 |
| 2023/0327546 | A1* | 10/2023 | Hosotani ............... | H02M 3/156 |
| 2023/0344330 | A1* | 10/2023 | Yamakaji .............. | H02M 3/003 |
| 2024/0136925 | A1* | 4/2024 | Ishikura ................ | H02M 3/003 |
| 2025/0096673 | A1* | 3/2025 | Hosotani .............. | H02M 1/126 |

FOREIGN PATENT DOCUMENTS

| | | | |
|---|---|---|---|
| JP | 6851554 | B1 | 3/2021 |
| WO | 2016/147492 | A1 | 9/2016 |
| WO | 2020/202797 | A1 | 10/2020 |

* cited by examiner

SWITCHING POWER SUPPLY DEVICE FOR REDUCING COMMON MODE NOISE GENERATED BY A SWITCHING ELEMENT

CROSS-REFERENCE TO RELATED APPLICATIONS

This application claims benefit of priority to International Patent Application No. PCT/JP2022/026657, filed Jul. 5, 2022, and to Japanese Patent Application No. 2021-126369, filed Aug. 2, 2021, the entire contents of each are incorporated herein by reference.

BACKGROUND

Technical Field

The present disclosure relates to a switching power supply device including a circuit board where an input unit of a direct-current input power supply, a DC-DC converter, and a noise reduction circuit are provided.

Background Art

Japanese Unexamined Patent Application Publication No. 2014-212623 discloses a switching power supply device including a switching circuit, an isolation transformer, a rectifying section, and a filtering section.

SUMMARY

In general, in a DC-DC converter including an isolation transformer, when a switching element is turned on or turned off, a steep change in voltage is caused by parasitic capacitance formed between a primary winding and a secondary winding of the isolation transformer, and a common mode noise current therefore flows to an output line of a direct-current voltage. When this noise current reaches, for example, a low-voltage battery connected to an output unit, electromagnetic interference with another electronic device connected to this low-voltage battery is caused.

The above-described noise current flows through a metal casing and a frame ground via a negative terminal of the output unit. Furthermore, when the switching element is turned on or turned off, a steep change in voltage is caused by stray capacitance formed between the switching element and the metal casing, and a common mode noise current flows to the metal casing and the frame ground. When these noise currents reach, for example, a high-voltage battery connected to an input unit via stray capacitance formed, for example, between the frame ground and a wire harness, electromagnetic interference with another electronic device connected to this high-voltage battery is caused.

In the switching power supply device disclosed in Japanese Unexamined Patent Application Publication No. 2014-212623, a common mode choke coil is provided in a direct-current input line for measures against electromagnetic interference on an input unit side, and a filter circuit including a choke coil and a capacitor is provided in a direct-current output line for measures against electromagnetic interference on an output unit side.

Meanwhile, to increase impedance of the common mode choke coil or choke coil in a frequency band of noise, the number of turns of the coil has to be increased. Because of this, however, power loss due to copper loss caused by the winding of the coil increases, resulting in a reduction in power conversion efficiency. Furthermore, when power loss of the common mode choke coil increases, a core constituting the common mode choke coil approaches a Curie temperature to thereby result in a reduction in the impedance of the common mode choke coil. This reduction in impedance may increase EMI noise in some cases.

Thus, the present disclosure aims to provide a switching power supply device that includes a DC-DC converter and a noise reduction circuit and in which common mode noise generated by switching operation of a switching element is reduced.

As an example of the present disclosure, a switching power supply device includes a circuit board where an input unit of a direct-current input power supply, an output unit of direct-current power, a DC-DC converter, and a noise reduction circuit are provided. The DC-DC converter includes an input capacitor, a switching circuit, and an output smoothing capacitor. The noise reduction circuit includes a surface-mount common mode choke coil mounted on the circuit board and including two input terminals and two output terminals. The two respective input terminals of the common mode choke coil are electrically connected to a positive terminal and a negative terminal of the input unit via first circuit patterns. The two respective output terminals of the common mode choke coil are electrically connected to two terminals of the input capacitor via second circuit patterns. The two respective terminals of the input capacitor are connected to two input ends of the switching circuit via third circuit patterns. The circuit board includes, as a plurality of current paths through which a switching current flows due to switching operation of the switching circuit, the first circuit patterns, the second circuit patterns, and the third circuit patterns. Path lengths of the second circuit patterns are longer than path lengths of the third circuit patterns. Of the plurality of current paths, the path lengths of the third circuit patterns are shortest in comparison with path lengths of other current paths. The circuit board includes a first parasitic capacitance formed by the first circuit patterns being parallel and facing each other, second parasitic capacitances formed by the second circuit patterns being parallel and facing each other, and a noise balanced circuit including a filter including the first parasitic capacitance, the common mode choke coil, and the second parasitic capacitances.

In the present disclosure, the switching power supply device can be obtained in which, when the noise balanced circuit is formed by using the parasitic capacitances formed by using a multilayer circuit board structure, the number of components is reduced owing to an equivalent capacitance of a parasitic capacitance, noise generated by switching operation of a switching element is cancelled out to achieve a balance in the noise balanced circuit, and common mode noise is kept from being generated.

DETAILED DESCRIPTION

A plurality of forms for implementing the present disclosure will be described below by giving some specific examples with reference to figures. In the figures, the same elements are denoted by the same reference signs. In consideration of ease of description or understanding of main points, a plurality of embodiments will be described separately for convenience of explanation. However, configurations described in different embodiments can be partially replaced or combined. In second and subsequent embodiments, a description of things in common with a first embodiment is omitted, and only respects in which the second and subsequent embodiments differ from the first embodiment will be described. In particular, similar function effects achieved by similar configurations are not repeatedly described in each embodiment.

First Embodiment

Figure 1:
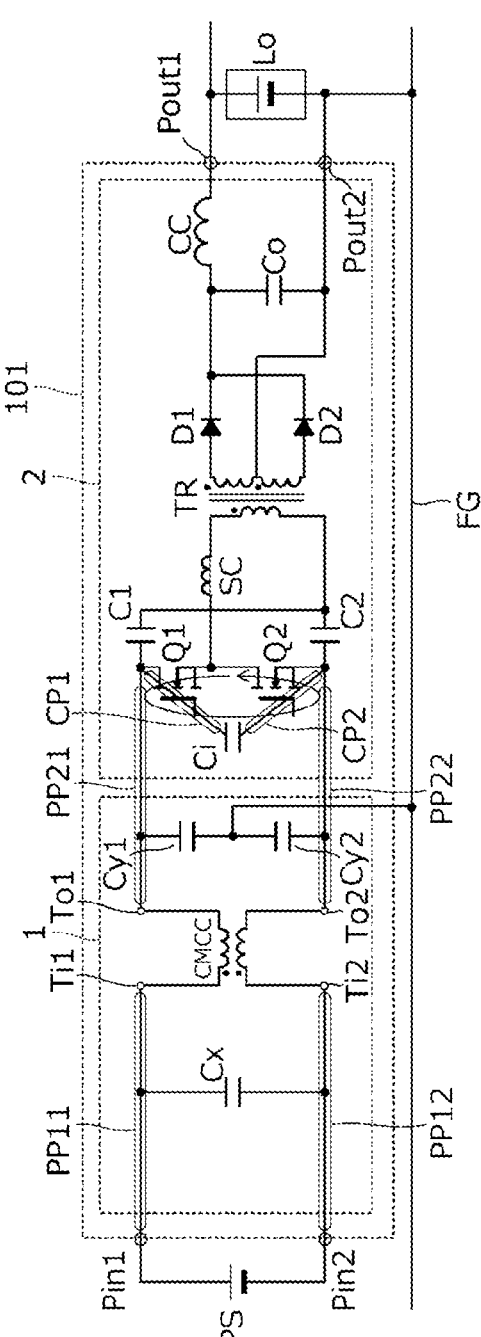
FIG. 1 is a circuit diagram of a switching power supply device 101 according to a first embodiment.

FIG. 1 is a circuit diagram of a switching power supply device 101 according to a first embodiment. The switching power supply device 101 includes a circuit board where an input unit Pin1, Pin2 of a direct-current input power supply, an output unit Pout1, Pout2 of direct-current power, a DC-DC converter 2, and a noise reduction circuit 1 are provided.

The DC-DC converter 2 includes an input capacitor Ci, a switching circuit including switching elements Q1 and Q2, capacitors C1 and C2, a smoothing coil SC, an isolation transformer TR, diodes D1 and D2, an output smoothing capacitor Co, and a choke coil CC.

The noise reduction circuit 1 includes a surface-mount common mode choke coil CMCC mounted on the above-described circuit board and including two input terminals Ti1 and Ti2, and two output terminals To1 and To2.

The two respective input terminals Ti1 and Ti2 of the common mode choke coil CMCC are electrically connected to a positive terminal (Pin1) and a negative terminal (Pin2) of the input unit via first circuit patterns PP11 and PP12. An X capacitor Cx is provided between the first circuit patterns PP11 and PP12. Furthermore, Y capacitors Cy1 and Cy2 are provided between both ends of the input capacitor Ci and a frame ground FG.

The two respective output terminals To1 and To2 of the common mode choke coil CMCC are electrically connected to two terminals of the input capacitor Ci via second circuit patterns PP21 and PP22.

The two respective terminals of the input capacitor Ci are connected to two input ends of the switching circuit including the switching elements Q1 and Q2 via third circuit patterns CP1 and CP2.

The smoothing coil SC is connected between a connection point between the switching elements Q1 and Q2 and one end of a primary winding of the isolation transformer TR, and the other end of the primary winding of the isolation transformer TR is connected to the second circuit patterns PP21 and PP22 via the capacitors C1 and C2.

The diodes D1 and D2, the output smoothing capacitor Co, and the choke coil CC are connected to a secondary winding of the isolation transformer TR.

Operation of the switching power supply device 101 will be described below. A direct-current input power supply PS is, for example, a lithium-ion battery and is a high-voltage battery, for example, of about several hundred V (ranging from about 200 V to 600 V). A direct-current voltage of the direct-current input power supply PS is input to the input unit Pin1, Pin2. The switching elements Q1 and Q2 are controlled in accordance with a control signal from a switching control circuit, and the switching element Q1 and the switching element Q2 are alternately turned on and off. An output voltage of the switching circuit including the switching elements Q1 and Q2 is applied to the primary winding of the isolation transformer TR, and an output current of the switching circuit flows to the primary winding of the isolation transformer TR. The diodes D1 and D2 rectify an output current of the secondary winding of the isolation transformer TR. The diodes D1 and D2 are an example of a rectifier element according to the present disclosure. The output smoothing capacitor Co smooths a voltage rectified by the diodes D1 and D2. The choke coil CC smooths a current that flows between the output smoothing capacitor Co and the output unit Pout1, Pout2. A load Lo is, for example, a lead secondary battery and is a low-voltage battery, for example, of about 12 V.

The above-described circuit board includes a plurality of current paths through which a switching current flows due to switching operation of the switching circuit. The switching elements Q1 and Q2 and the input capacitor Ci form a current loop including the third circuit patterns CP1 and CP2. Path lengths of the second circuit patterns PP21 and PP22 are longer than path lengths of the third circuit patterns CP1 and CP2. Furthermore, of the above-described plurality of current paths, the path lengths of the third circuit patterns CP1 and CP2 are the shortest in comparison with path lengths of the other current paths.

The above-described X capacitor Cx is a parasitic capacitance formed by the first circuit patterns PP11 and PP12 being parallel and facing each other and corresponds to "first parasitic capacitance" according to the present disclosure. Furthermore, the above-described Y capacitors Cy1 and Cy2 are parasitic capacitances formed by the second circuit patterns PP21 and PP22 being parallel and facing each other and correspond to "second parasitic capacitances" according to the present disclosure.

The above-described X capacitor Cx, common mode choke coil CMCC, and Y capacitors Cy1 and Cy2 form a C-L-C π-type low pass filter, and this low pass filter reduces noise. In particular, the second parasitic capacitances reduce common mode noise.

Although, in an example illustrated in FIG. 1, the Y capacitors Cy1 and Cy2 are directly connected to the frame ground FG, the Y capacitors Cy1 and Cy2 may be electrically connected to the frame ground FG via a capacitive element or an impedance element. This results in an effective noise reduction effect applicable to a material or a structure of the frame ground FG.

To the direct-current input power supply PS, another electronic device that receives a supply of power from this direct-current input power supply PS to operate at a high voltage is connected. This other electronic device is, for example, an inverter or motor. Furthermore, the load Lo is a low-voltage battery, and a supply of power to the other electric device is received from this low-voltage battery or the switching power supply device 101. This other electronic device is, for example, a car navigation system or wireless communication device that operates at the above-described low voltage.

In the switching power supply device 101 according to this embodiment, as illustrated in FIG. 1, the circuit board includes a plurality of current paths through which a switching current flows due to switching operation of the switching circuit. The path lengths of the second circuit patterns PP21 and PP22 are longer than the path lengths of the third circuit patterns CP1 and CP2. Furthermore, of the above-described plurality of current paths, the path lengths of the third circuit patterns CP1 and CP2 are the shortest in comparison with the path lengths of the other current paths. Thus, a common mode noise current generated by switching of the switching elements Q1 and Q2 that are a noise source flows through the current loop defined by the switching elements Q1 and Q2 and the input capacitor Ci. The path lengths of the third circuit patterns CP1 and CP2 that are part of this current loop are the shortest in comparison with the path lengths of the other current paths. Hence, common mode noise generated from this current loop is sufficiently reduced.

Figure 2:
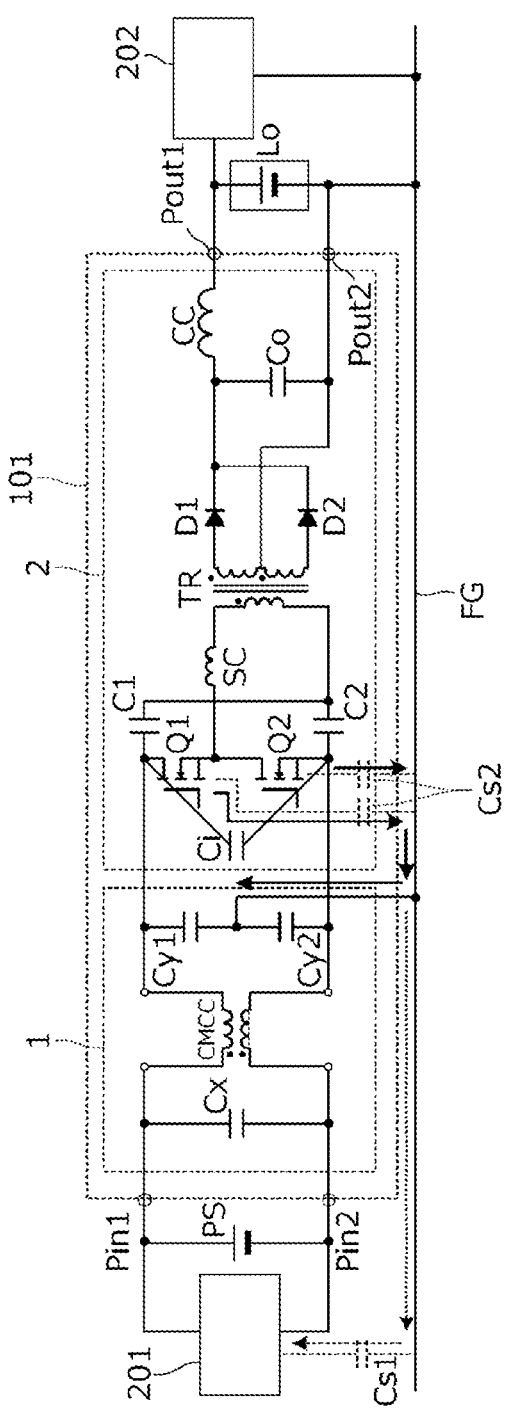
FIG. 2 is a diagram illustrating a path of a noise current that flows through the switching power supply device 101 according to the first embodiment.

Next, functions of the noise reduction circuit 1 will be described. FIG. 2 is a diagram illustrating a path of a noise current that flows through the switching power supply device 101 according to the first embodiment.

In FIG. 2, to the direct-current input power supply PS, another electronic device 201 that receives a supply of power from this direct-current input power supply PS is connected. This other electronic device 201 is, for example, an inverter or motor that operates at a high voltage. Furthermore, in this example, the load Lo is a low-voltage battery, and another electronic device 202 that receives a supply of power from this low-voltage battery or the switching power supply device 101 is connected to the load Lo. This other electronic device 202 is, for example, a car navigation system or wireless communication device that operates at the above-described low voltage.

The switching power supply device 101 is provided in a metal casing that is electrically continuous with the frame ground FG. A ground pattern of the circuit board constituting the switching power supply device 101 is electrically continuous with the frame ground FG via the metal casing. That is, a negative terminal Pout 2 of the output unit of the switching power supply device 101 is connected to the metal casing. Thus, operation of a feedback control circuit is stabilized, and a high noise reduction effect is achieved.

A parasitic capacitance Cs1 is formed between the other electronic device 201 and the frame ground FG, and parasitic capacitances Cs2 are formed between the switching elements Q1 and Q2 and the metal casing.

As described above, the other electronic device 201 is an inverter or motor and is installed to the frame ground FG with being electrically insulated and being thermally conductive via an insulator sheet. At a portion where this insulator sheet is interposed, the parasitic capacitance Cs1 is formed.

The switching elements Q1 and Q2 are thermally coupled to the metal casing via an insulator sheet to dissipate heat that is generated to the metal casing and the frame ground FG. At portions where this insulator sheet is interposed, the above-described parasitic capacitances Cs2 are formed.

In an existing circuit configuration, a common mode noise current from the switching elements Q1 and Q2 that are a noise source flows to the other electronic device 201 through the parasitic capacitances Cs2 and Cs1 and the frame ground FG. This causes electromagnetic interference with the other electronic device 201. Furthermore, a high-frequency magnetic field is generated by a common mode noise current that flows through the frame ground FG, and electromagnetic noise is radiated from a mobile unit to the outside. This causes electromagnetic interference with an external mobile unit or external electronic device.

Furthermore, in a path of a common mode noise current, Joule loss is caused by the flow of a common mode noise current. Hence, a reduction in power conversion efficiency by the amount of this loss is also caused.

On the other hand, in the switching power supply device 101 according to this embodiment, as illustrated in FIG. 2, a common mode noise current from the switching elements Q1 and Q2 that are a noise source circulates through the parasitic capacitances Cs2 and the frame ground FG, and through the Y capacitors Cy1 and Cy2. Thus, the noise current does not reach the input unit Pin1, Pin2, and electromagnetic interference with the other electronic device 201 is inhibited.

The common mode choke coil CMCC is provided between the X capacitor Cx and the Y capacitors Cy1 and Cy2, and thus the X capacitor Cx, the common mode choke coil CMCC, and the Y capacitors Cy1 and Cy2 form a low pass filter for common mode noise, and this low pass filter reduces a noise current to the electronic device 201.

Next, other characteristic function effects of the switching power supply device according to this embodiment will be described.

(a) As illustrated in FIG. 1, the Y capacitors Cy1 and Cy2 are electrically connected between the common mode choke coil CMCC and the input capacitor Ci. Thus, two low pass filters are constituted by the common mode choke coil CMCC and the Y capacitors Cy1 and Cy2, and a great noise reduction effect is achieved.

Figure 5A:
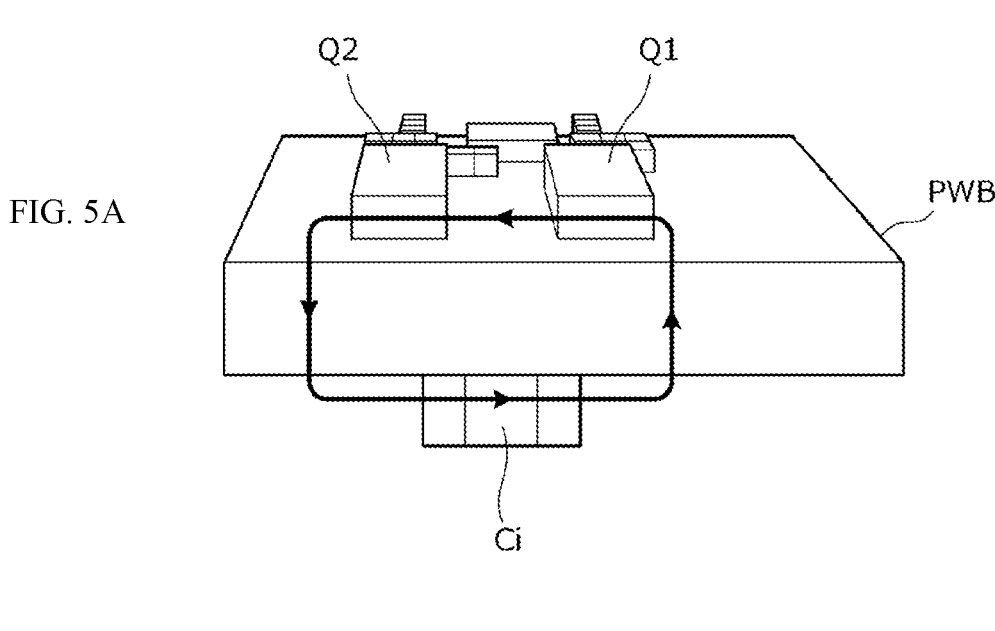
FIGS. 5A, 5B, and 5C are views illustrating a structure in which, of the switching power supply device according to a second embodiment, switching elements Q1 and Q2 and an input capacitor Ci, in particular, are mounted on the board.
Figure 5B:
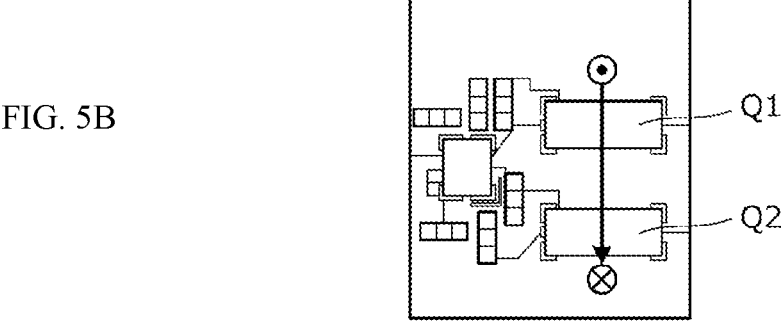
Figure 5C:
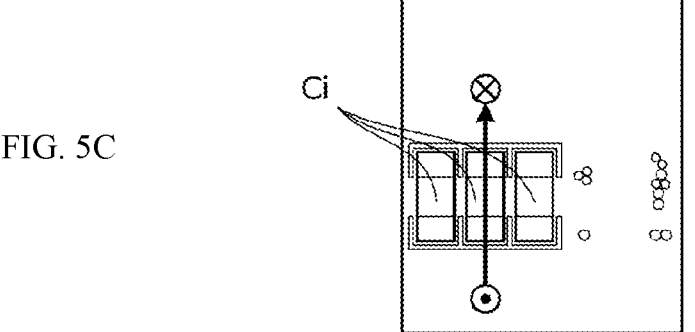

(b) The switching circuit including the switching elements Q1 and Q2 is disposed on one main surface of a multilayer circuit board, and the input capacitor Ci is disposed on another main surface of the multilayer circuit board (see a second embodiment, and FIGS. 5A, 5B, and 5C). A plane of a current loop that passes through the input capacitor Ci and the switching circuit is not parallel to a current path that passes through a circuit unit formed on the other main surface of the circuit board. The input capacitor Ci is directly connected to, of the switching circuit on the multilayer circuit board, a connection portion at one end and a connection portion at another end, for example, via one or a plurality of through-hole conductors so that distances to the respective connection portions are the shortest. Thus, a current path that passes through the switching circuit and the input capacitor Ci can have the shortest path length in comparison with path lengths of the other current paths.

(c) A connection point between the Y capacitors Cy1 and Cy2 is electrically connected to the frame ground FG, and thus the Y capacitors Cy1 and Cy2 efficiently reduce common mode noise.

(d) The connection point between the Y capacitors Cy1 and Cy2 is electrically connected to the frame ground FG. Thus, a high common mode noise current reduction effect is achieved. Incidentally, the connection point between the Y capacitors Cy1 and Cy2 may be electrically connected to the frame ground via a capacitive element or an impedance element.

(e) The negative terminal (Pout2) of the output unit Pout1, Pout2 of direct-current power is at the same potential as the frame ground FG of the casing of the switching power supply device 101. Thus, operation of the "feedback control circuit (not illustrated)" is stabilized in which an output voltage is detected and switching operation of the switching elements Q1 and Q2 is controlled to stabilize the output voltage at a predetermined value, and a high noise reduction effect is achieved.

Figure 4:
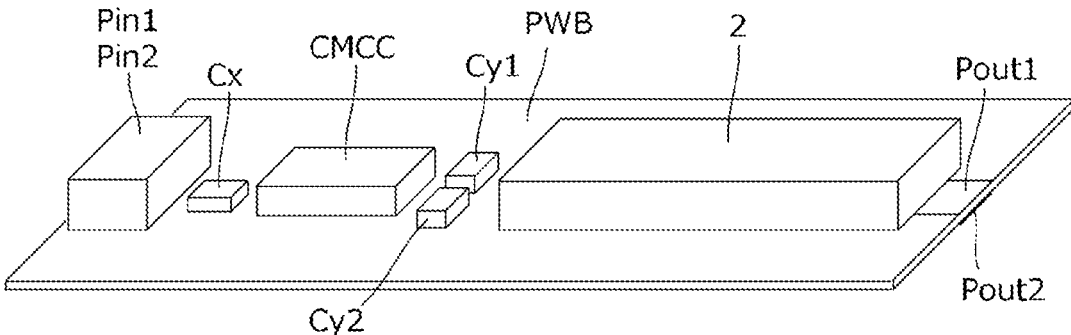
FIG. 4 is a perspective view illustrating a configuration on a circuit board of the switching power supply device.

(f) The noise reduction circuit 1 is located between the direct-current input power supply PS and the input capacitor Ci and is linearly disposed between the input unit Pin1, Pin2 and the DC-DC converter 2 on the circuit board (see the second embodiment, and FIG. 4). In this configuration, a great noise reduction effect is achieved by a function capable of reducing jumping of noise due to electromagnetic interference, for example, in a plurality of electronic components constituting a circuit.

(g) The noise reduction circuit 1 is symmetric for the positive terminal and the negative terminal, a great common mode noise cancellation effect is thus achieved, and common mode noise is kept from being generated.

(h) In the noise reduction circuit 1, patterns of the positive terminal and the negative terminal are sufficiently large in comparison with a component-mounting land for mounting the common mode choke coil. Thus, dissipation of heat generated in the common mode choke coil is high.

(i) The circuit board includes a frame ground layer, thus achieving a high noise reduction effect and also stabilizing power conversion operation.

(j) The negative terminal of the input unit Pin1, Pin2 and a negative terminal of the input capacitor Ci are larger in area than the positive terminal of the input unit Pin1, Pin2 and a positive terminal of the input capacitor Ci, thus enhancing noise immunity of the switching control circuit and providing high stability in operation of the switching power supply device.

(k) The frame ground FG is caused to be at the same potential as the negative terminal of the output unit of the DC-DC converter, a noise balanced circuit can thus be formed in a simple structure, and a high noise reduction effect is achieved.

(l) The metal casing is included and is connected to the frame ground FG so as to be at the same potential as the frame ground FG, and thus a high noise reduction effect is achieved.

(m) The noise balanced circuit formed by using the noise reduction circuit 1 in which the circuit board is used cancels out common mode noise generated by switching operation in the switching elements Q1 and Q2 to achieve a balance, enabling an increase in noise reduction effect.

(n) Common mode noise is cancelled out to achieve a balance, a noise reduction effect can be increased, and high heat dissipation characteristics can also be obtained. That is, a noise reduction effect and a heat dissipation effect can be implemented simultaneously.

(o) Parasitic capacitances formed by patterns of the positive terminal and the negative terminal on the circuit board are used, and thus the number of capacitors as mounted components is reduced, enabling a reduction in size and weight.

(p) A parasitic capacitance formed by using the circuit board is used as a capacitor of a low pass filter, and thus a high noise reduction effect is achieved.

Second Embodiment

In the second embodiment, in particular, a structure of the circuit board of the switching power supply device will be illustrated.

Figure 3:
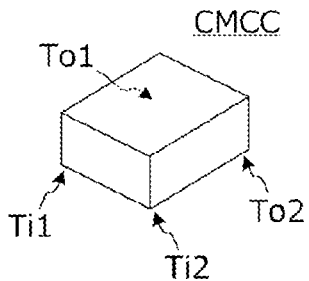
FIG. 3 is a perspective view of a common mode choke coil.

FIG. 3 is a perspective view of the common mode choke coil. FIG. 4 is a perspective view illustrating a configuration on the circuit board of the switching power supply device.

As illustrated in FIG. 3, the common mode choke coil CMCC has a rectangular parallelepiped shape, and four terminals Ti1, Ti2, To1, and To2 are formed on a bottom surface. This common mode choke coil CMCC includes, in a resin case, a toroidal coil including a ring-shaped magnetic core and a conductor wound on the magnetic core.

As illustrated in FIG. 4, on a circuit board PWB, a connector of the input unit Pin1, Pin2 of the direct-current input power supply, the X capacitor Cx, the common mode choke coil CMCC, the Y capacitors Cy1 and Cy2, and the DC-DC converter 2 are provided. The positive terminal (Pin1) of the input unit, the positive terminal of the input capacitor Ci, the negative terminal (Pin2) of the input unit, and the negative terminal of the input capacitor Ci are individually connected to a plurality of conductor layers of the circuit board PWB via a plurality of through-hole conductors. A circuit configuration of this switching power supply device is as described in the first embodiment. This configuration results in high heat dissipation and also enables a reduction in conductor loss.

FIGS. 5A, 5B, and 5C are views illustrating a structure in which, of the switching power supply device according to the second embodiment, the switching elements Q1 and Q2 and the input capacitor Ci, in particular, are mounted on the board. FIG. 5A is a perspective view of the circuit board PWB where the input capacitor Ci and the switching elements Q1 and Q2 are mounted viewed from the side. FIG. 5B is a plan view of the circuit board PWB, and FIG. 5C is a bottom view of the circuit board PWB.

The input capacitor Ci is constituted by three chip capacitors connected in parallel, and each of them is mounted on a bottom surface of the circuit board PWB. The switching elements Q1 and Q2 are mounted on a top surface of the circuit board PWB. A positional relationship exists in which the input capacitor Ci overlaps the switching elements Q1 and Q2 when the circuit board PWB is viewed in plan.

In FIGS. 5A, 5B, and 5C, arrows schematically represent a path of current that flows through a connection loop defined by the input capacitor Ci and the switching elements Q1 and Q2.

Thus, the switching elements Q1 and Q2 are mounted on one main surface of the circuit board PWB, the input capacitor Ci is mounted on another main surface of the circuit board PWB, the input capacitor Ci at least partially overlaps the switching elements Q1 and Q2 when the circuit board PWB is viewed in plan, and thus a plane of a current loop that passes through the input capacitor Ci and the switching circuit is not parallel to a current path that passes through a circuit unit formed on the other main surface of the circuit board PWB. Furthermore, the input capacitor Ci is directly connected to the connection portion at the one end and the connection portion at the other end of the switching circuit on the circuit board PWB so that distances to the respective connection portions are the shortest, and thus the path of current that flows through the connection loop defined by the input capacitor Ci and the switching elements Q1 and Q2 is extremely short.

Furthermore, in this embodiment, a loop plane of the connection loop defined by the input capacitor Ci and the switching elements Q1 and Q2 faces a surface (side) of the circuit board PWB, and thus magnetic field coupling to another component mounted on the circuit board PWB does not easily occur. For this reason, there is little noise propagation or noise radiation due to unwanted coupling.

Incidentally, the input capacitor Ci does not necessarily have to be mounted on the surface of the circuit board. For example, the circuit board PWB may be implemented as a multilayer board to form the input capacitor Ci within this multilayer board.

Third Embodiment

In a third embodiment, a switching power supply device will be illustrated in which a configuration between the input unit and the switching circuit differs from the example described in the first embodiment.

Figure 6:
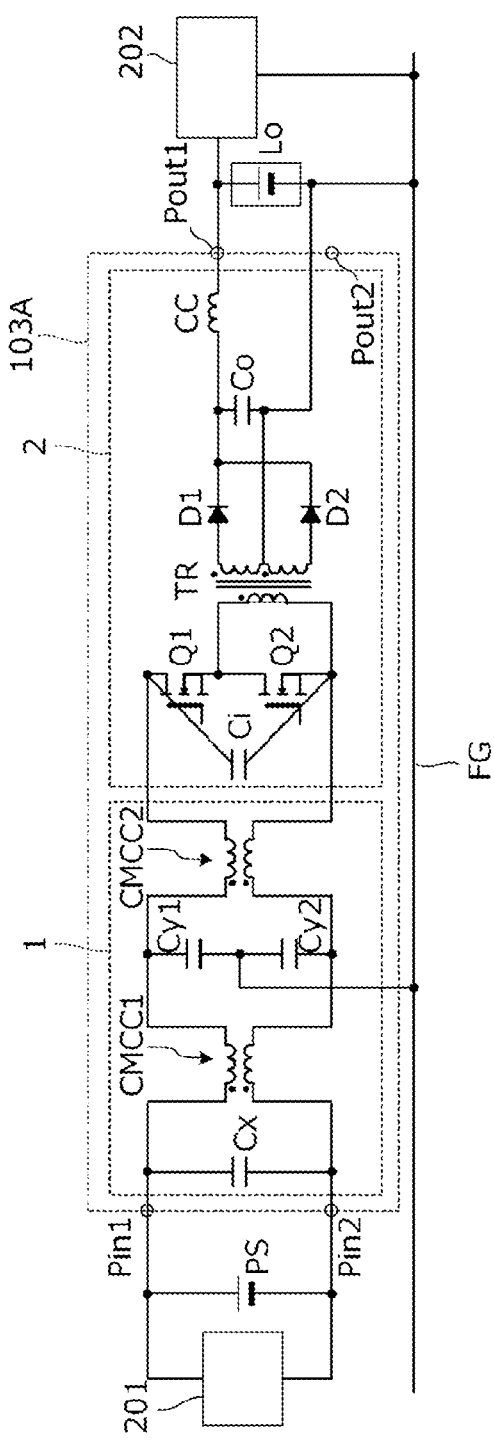
FIG. 6 is a circuit diagram of a switching power supply device 103A according to a third embodiment.

FIG. 6 is a circuit diagram of a switching power supply device 103A according to the third embodiment. The switching power supply device 103A includes the circuit board where the input unit Pin1, Pin2 of the direct-current input power supply, the output unit Pout1, Pout2 of direct-current power, the DC-DC converter 2, and the noise reduction circuit 1 are provided.

The switching power supply device 103A differs from the switching power supply device 101 illustrated in FIG. 1 in that a second common mode choke coil CMCC2 is included between the Y capacitors Cy1 and Cy2 and the input capacitor Ci. This second common mode choke coil CMCC2 is part of the noise reduction circuit.

For example, a self-resonant frequency of one of a first common mode choke coil CMCC1 and the second common mode choke coil CMCC2 ranges from 0.53 MHz to 1.8 MHz inclusive, and a self-resonant frequency of the other ranges from 76 MHz to 108 MHz inclusive. In such a configuration, in an AM radio broadcast frequency band (0.53 MHz to 1.8 MHz) and an FM radio broadcast frequency band (76 MHz to 108 MHz), propagation of a noise current to the other electronic device 201 connected to the direct-current input power supply PS is effectively reduced, enabling a reduction in electromagnetic interference with the other electronic device 201.

Figure 7:
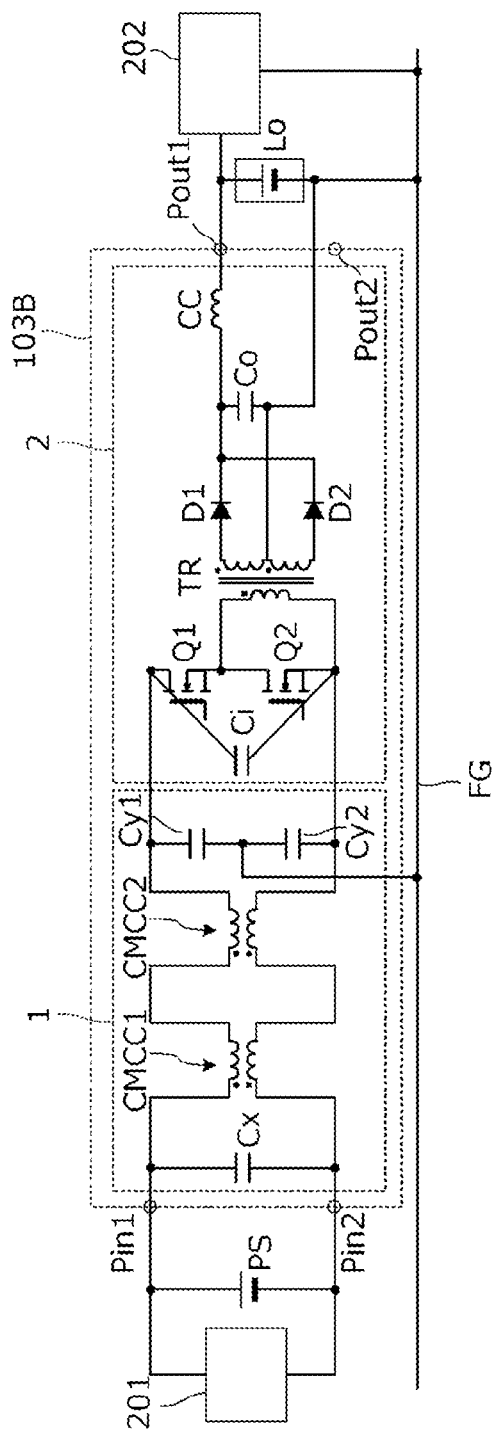
FIG. 7 is a circuit diagram of another switching power supply device 103B according to the third embodiment.

FIG. 7 is a circuit diagram of another switching power supply device 103B according to the third embodiment. As in the switching power supply device 103A illustrated in FIG. 6, the switching power supply device 103B includes, between the input unit Pin1, Pin2 and the input capacitor Ci, the X capacitor Cx connected between the positive terminal and the negative terminal of the input unit Pin1, Pin2 and also includes, between the X capacitor Cx and the input capacitor Ci, the Y capacitors Cy1 and Cy2 connected respectively between the positive terminal of the input unit Pin1, Pin2 and the metal casing and the frame ground FG and between the negative terminal of the input unit Pin1, Pin2 and the metal casing and the frame ground FG.

The switching power supply device 103B illustrated in FIG. 7 includes the second common mode choke coil CMCC2 between the Y capacitors Cy1 and Cy2 and the first common mode choke coil CMCC1. For example, a self-resonant frequency of one of the first common mode choke coil CMCC1 and the second common mode choke coil CMCC2 ranges from 0.53 MHz to 1.8 MHz inclusive, and a self-resonant frequency of the other ranges from 76 MHz to 108 MHz inclusive. In such a configuration as well, propagation of a noise current to the other electronic device 201 connected to the direct-current input power supply PS is effectively reduced, enabling a reduction in electromagnetic interference with the other electronic device 201.

As described above, when a plurality of surface-mount common mode choke coils CMCCs are included, a plurality of π-type filters are formed, resulting in a high noise reduction effect. Furthermore, noise of a plurality of specific frequencies can be reduced.

Besides the embodiments described above, a switching power supply device having the following configuration can be provided.

In the examples illustrated in FIGS. 1 and 2, although the rectifier element that rectifies an output of the isolation transformer TR is constituted by the diodes D1 and D2, the rectifier element may be constituted by synchronous rectifier elements that are switched synchronously with the switching elements Q1 and Q2. This can reduce loss in the rectifier element. For example, as for a DC-DC converter in the switching power supply device 101 installed in an electric vehicle, loss in the DC-DC converter can be reduced.

Furthermore, in FIGS. 1 and 2, although the switching power supply device including the step-down DC-DC converter 2 is illustrated, the present disclosure can be similarly applied to a switching power supply device including a step-up DC-DC converter or a step-up and step-down DC-DC converter. Furthermore, in FIGS. 1 and 2, and other figures, although the switching power supply device including the isolated DC-DC converter 2 including the isolation transformer TR is illustrated, the present disclosure can be similarly applied to a switching power supply device including a non-isolated DC-DC converter.

Finally, the present disclosure is not intended to be limited to the above-described embodiments. Modifications and changes may be made as appropriate by those skilled in the art. The scope of the present disclosure is defined not by the above-described embodiments but by the claims. Furthermore, the scope of the present disclosure includes modifications and changes made to the embodiments within a scope equivalent to the claims.

What is claimed is:

1. A switching power supply device comprising:

a circuit board including an input unit of a direct-current input power supply, an output unit of direct-current power, a DC-DC converter including an input capacitor, a switching circuit, and an output smoothing capacitor, and a noise reduction circuit including at least one surface-mount common mode choke coil mounted on the circuit board, the at least one surface-mount common mode choke coil including two input terminals and two output terminals, wherein the two input terminals of the at least one surface-mount common mode choke coil are electrically connected to a positive terminal and a negative terminal of the input unit via first circuit patterns, the two output terminals of the at least one surface-mount common mode choke coil are electrically connected to two terminals of the input capacitor via second circuit patterns, the two terminals of the input capacitor are connected to two input ends of the switching circuit via third circuit patterns, the circuit board includes, as a plurality of current paths through which a switching current flows due to switching operation of the switching circuit, the first circuit patterns, the second circuit patterns, and the third circuit patterns, path lengths of the second circuit patterns are longer than path lengths of the third circuit patterns, of the plurality of current paths, the path lengths of the third circuit patterns are shortest in comparison with path lengths of other current paths, and the circuit board includes a first parasitic capacitance configured by the first circuit patterns being parallel and facing each other, second parasitic capacitances configured by the second circuit patterns being parallel and facing each other, and a noise balanced circuit including a filter including the first parasitic capacitance, the at least one surface-mount common mode choke coil, and the second parasitic capacitances.

2. The switching power supply device according to claim 1, wherein
the second parasitic capacitances are between the two output terminals of the at least one surface-mount common mode choke coil and the input capacitor, and are further connected to a frame ground.

3. The switching power supply device according to claim 2, wherein
the second parasitic capacitances are electrically connected to the frame ground via a capacitive element or an impedance element.

4. The switching power supply device according to claim 2, wherein
the switching circuit is on one main surface of the circuit board,
the input capacitor is on another main surface of the circuit board,
a plane of a current loop that passes through the input capacitor and the switching circuit is not parallel to a current path that passes through a circuit unit on the other main surface of the circuit board, and
the input capacitor is directly connected to a connection portion at one end and a connection portion at another end of the switching circuit on the circuit board.

5. The switching power supply device according to claim 2, wherein
the DC-DC converter is a step-up, step-down, or step-up and step-down non-isolated converter.

6. The switching power supply device according to claim 2, wherein
the DC-DC converter is an isolated converter.

7. The switching power supply device according to claim 2, wherein
the switching power supply device comprises a metal casing housing the circuit board, and
a negative terminal of the output unit is connected to the metal casing.

8. The switching power supply device according to claim 1, wherein
the switching circuit is on one main surface of the circuit board,
the input capacitor is on another main surface of the circuit board,
a plane of a current loop that passes through the input capacitor and the switching circuit is not parallel to a current path that passes through a circuit unit on the other main surface of the circuit board, and
the input capacitor is directly connected to a connection portion at one end and a connection portion at another end of the switching circuit on the circuit board.

9. The switching power supply device according to claim 1, wherein the DC-DC converter is a step-up, step-down, or step-up and step-down non-isolated converter.

10. The switching power supply device according to claim 1, wherein
the DC-DC converter is an isolated converter.

11. The switching power supply device according to claim 1, wherein
the switching power supply device comprises a metal casing housing the circuit board, and
a negative terminal of the output unit is connected to the metal casing.

12. The switching power supply device according to claim 11, wherein
the circuit board includes a ground electrode layer that is electrically continuous with the metal casing.

13. The switching power supply device according to claim 12, wherein
the metal casing is connected to a frame ground.

14. The switching power supply device according to claim 11, wherein
the metal casing is connected to a frame ground.

15. The switching power supply device according to claim 1, wherein
the noise reduction circuit is between the input unit and the input capacitor and is linearly between the input unit and the DC-DC converter on the circuit board.

16. The switching power supply device according to claim 1, wherein
the noise reduction circuit is symmetric for a pair of the positive terminal of the input unit and the negative terminal of the input unit.

17. The switching power supply device according to claim 1, wherein
conductor patterns of the positive terminal and the negative terminal of the input unit and a positive terminal and a negative terminal of the input capacitor are large in comparison with a mounting land of the at least one surface-mount common mode choke coil.

18. The switching power supply device according to claim 1, wherein
the negative terminal of the input unit and a negative terminal of the input capacitor are larger in area than the positive terminal of the input unit and a positive terminal of the input capacitor.

19. The switching power supply device according to claim 1, wherein
the positive terminal of the input unit, a positive terminal of the input capacitor, the negative terminal of the input unit, and a negative terminal of the input capacitor are individually connected to a plurality of conductor layers of the circuit board via a plurality of through-hole conductors.

20. The switching power supply device according to claim 1, wherein
the noise reduction circuit comprises a plurality of the at least one surface-mount common mode choke coil.

* * * * *